United States Patent
Wiedmeyer

[11] Patent Number: 6,048,146
[45] Date of Patent: Apr. 11, 2000

[54] JACKING CHAIN BINDER

[76] Inventor: Thomas J. Wiedmeyer, W. 3799 Hwy. 67, Campbellsport, Wis. 53010

[21] Appl. No.: 09/065,200

[22] Filed: Apr. 23, 1998

[51] Int. Cl.[7] .................................................. B60P 7/08
[52] U.S. Cl. ........................... 410/100; 410/34; 410/97
[58] Field of Search ............................ 410/97, 99, 100, 410/103, 12, 34; 24/68 CD, 68 CF, 265 CD; 248/499; 254/243, 245, 246, 228, 256, 105, 114

[56] References Cited

U.S. PATENT DOCUMENTS

| | | | |
|---|---|---|---|
| 2,715,008 | 8/1955 | Huber | 410/99 X |
| 2,773,700 | 12/1956 | Lasswell | 410/103 X |
| 4,013,266 | 3/1977 | Lapp | 254/228 |
| 4,247,235 | 1/1981 | Sunesson | 410/100 X |
| 4,314,783 | 2/1982 | Parnell et al. | 410/34 |
| 4,706,343 | 11/1987 | Neidigk | 410/103 X |
| 4,993,687 | 2/1991 | Crook et al. | 24/68 CT |
| 5,288,187 | 2/1994 | Ward | 410/100 |
| 5,429,462 | 7/1995 | Anderson | 410/100 |

FOREIGN PATENT DOCUMENTS 7713057  12/1978  Sweden .................................. 410/34

*Primary Examiner*—Stephen T. Gordon

[57] ABSTRACT

An adjustable length strap tie down apparatus is provided including a sleeve having at least one bore formed therein and a first hook mounted thereon. Also included is a rectangular strip slidably situated within the sleeve and including a second hook mounted thereon. At least one spring biased locking button is provided for entering the bore to preclude movement between the sleeve and the strip. Further, a plurality of teeth are formed on the strip. Also included is a ratchet assembly mounted on the sleeve for retracting the strip within the sleeve upon the reciprocation thereof.

1 Claim, 4 Drawing Sheets

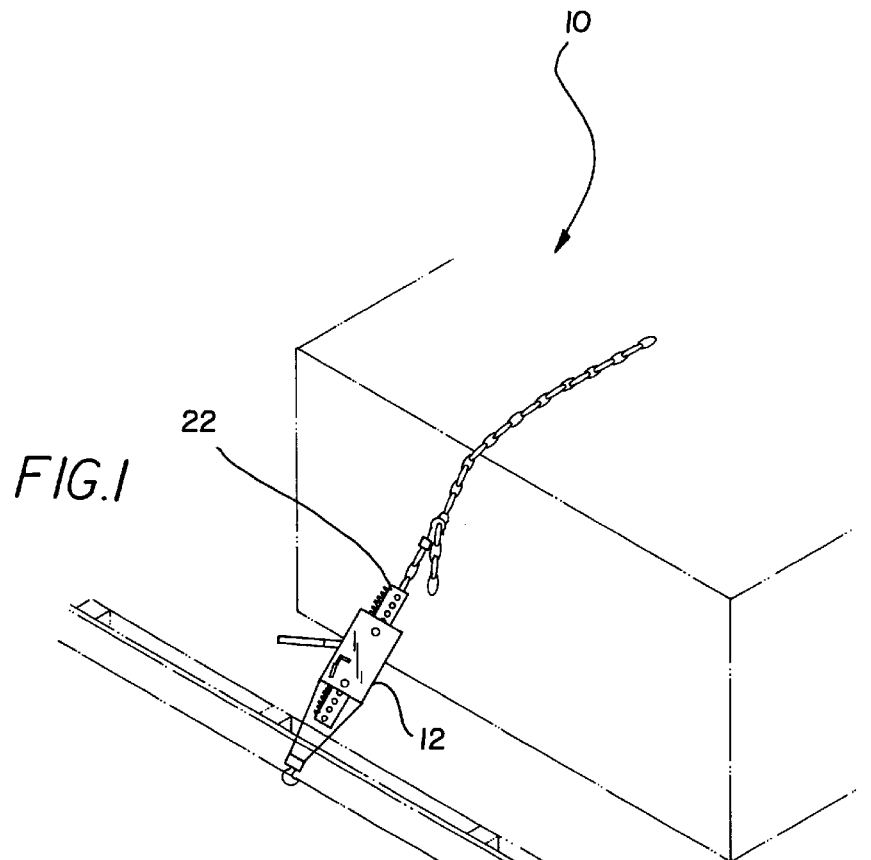
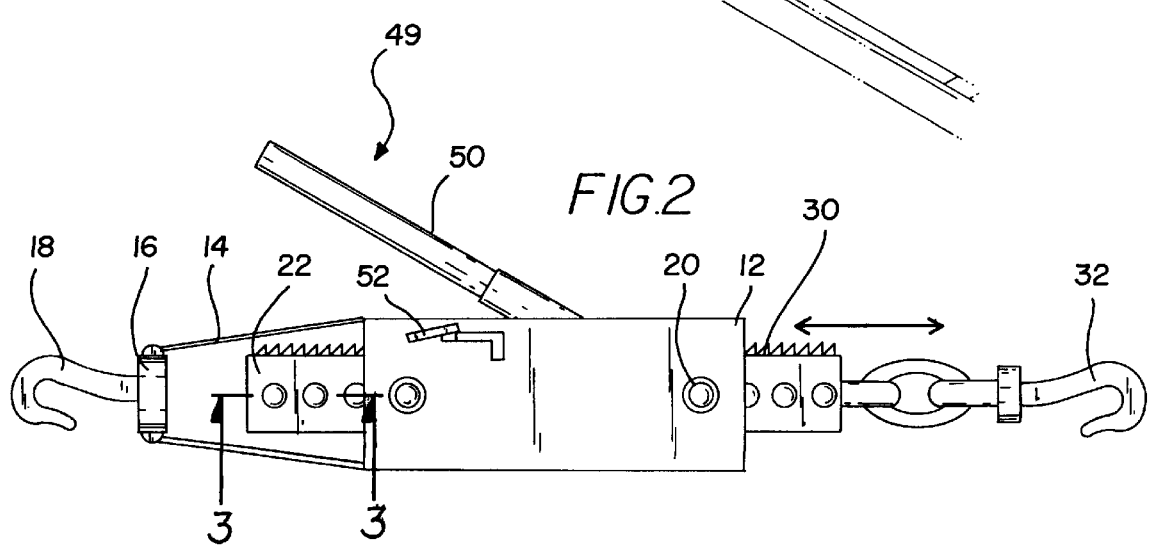

JACKING CHAIN BINDER

BACKGROUND OF THE INVENTION

1. Field of the Invention

The present invention relates to binding apparatuses and more particularly pertains to a new jacking chain binder for safely binding a chain which restrains a cargo load on a vehicle.

2. Description of the Prior Art

The use of binding apparatuses is known in the prior art. More specifically, binding apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art binding apparatuses include U. S. Pat. No. 4,155,537; U.S. Pat. No. 4,900,203; U.S. Pat. No. 810,795; U.S. Pat. No. 4,120,077; U.S. Pat. No. Des. 266, 985; and U.S. Pat. No. 3,428,331.

In these respects, the jacking chain binder according to the present invention substantially departs from the conventional concepts and designs of the prior art, and in so doing provides an apparatus primarily developed for the purpose of safely binding a chain which restrains a cargo load on a vehicle.

SUMMARY OF THE INVENTION

In view of the foregoing disadvantages inherent in the known types of binding apparatuses now present in the prior art, the present invention provides a new jacking chain binder construction wherein the same can be utilized for safely binding a chain which restrains a cargo load on a vehicle.

The general purpose of the present invention, which will be described subsequently in greater detail, is to provide a new jacking chain binder apparatus and method which has many of the advantages of the binding apparatuses mentioned heretofore and many novel features that result in a new jacking chain binder which is not anticipated, rendered obvious, suggested, or even implied by any of the prior art binding apparatuses, either alone or in any combination thereof.

To attain this, the present invention generally comprises a sleeve including a planar rectangular top face, a planar rectangular bottom face and a pair of thin side faces for defining an interior space and a pair of open ends. The sleeve further includes a pair of tapering mounting members having inboard ends integrally coupled to the side faces adjacent one of the open ends of the sleeve and extending outwardly therefrom. Mounted on outboard ends of the tapering mounting members is a swivel. Such swivel is in turn rotatable mounted to a first hook. For reasons that will soon become apparent, the top face has a pair of spaced bores formed therein adjacent to the open ends of the sleeve. Next provided is a rectangular strip slidably situated within the sleeve. The rectangular strip includes a planar rectangular top face, a planar rectangular bottom face and a pair of thin side and end faces for defining an interior space. The top face has a plurality of circular bores formed therein, as shown in FIG. 3. Also shown in such Figure, a plurality of locking buttons are each situated within a corresponding one of the circular bores. Ideally, each locking button has a cylindrical lower extent with an annular flange mounted thereon and a semi-spherical upper extent. A plurality of springs are mounted between the rear face of the strip and an associated one of the locking buttons for urging the same from the associated circular bore. When the spring is fully extended, the upper and lower extent of the button extends through the bore and the annular flange abuts the top face of the strip. The strip also includes a plurality of teeth formed on one of the thin side faces thereof. A second hook is swivelably connected to one of the end faces of the strip. By this structure, the locking buttons are adapted to be situated within the spaced bores of the sleeve for fixing the strip with respect to the sleeve. Further, the locking buttons may be depressed to allow movement of the strip with respect to the sleeve. For allowing a user to selectively preclude the use of the locking buttons, a pair of locking assemblies are provided, as shown in FIGS. 5 & 6. Each of the locking assemblies include a tube integrally mounted over an associated one of the spaced bores of the sleeve. An S-shaped groove is formed in a periphery of the tube. Further, a locking pin is slidably situated within the tube with a knurled disk-shaped grip mounted on a top thereof. In addition, the locking pin is equipped with a radially extending peg integrally coupled to a periphery thereof for being slidably received within the S-shaped groove. For urging the locking pin outwardly, a spring is mounted between the locking pin and the tube. By this structure, the locking pins each have a lowered orientation for preventing the locking buttons of the strip from entering the corresponding spaced bore of the sleeve. As such, the strip may slide freely within the sleeve. The locking pins each further have a raised orientation for allowing the locking buttons of the strip to enter the corresponding spaced bore of the sleeve. In such orientation, the strip is precluded from sliding freely within the sleeve. It should be noted that the locking pins may be transferred between the raised and orientation by way of the rotation thereof such that the radially extending peg is maneuvered within the S-shaped groove. Note FIGS. 5 & 6. Finally, a ratchet assembly is included with a jack handle pivotally coupled at an inboard end thereof to one of the thin side faces of the sleeve. Such jack handle further remains in engagement with the teeth of the strip for retracting the strip within the sleeve upon the reciprocation of the jack handle. The ratchet assembly further includes a release lever mounted on the top face of the sleeve adjacent to the jack handle. This release lever functions for releasing the jack handle from the teeth of the strip to allow the movement of the strip within the sleeve when the locking buttons are prevented from entering the spaced bores of the sleeve.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new jacking chain binder apparatus and method which has many of the advantages of the binding apparatuses mentioned heretofore and many novel features that result in a new jacking chain binder which is not anticipated, rendered obvious, suggested, or even implied by any of the prior art binding apparatuses, either alone or in any combination thereof.

It is another object of the present invention to provide a new jacking chain binder which may be easily and efficiently manufactured and marketed.

It is a further object of the present invention to provide a new jacking chain binder which is of a durable and reliable construction.

An even further object of the present invention is to provide a new jacking chain binder which is susceptible of a low cost of manufacture with regard to both materials and labor, and which accordingly is then susceptible of low prices of sale to the consuming public, thereby making such jacking chain binder economically available to the buying public.

Still yet another object of the present invention is to provide a new jacking chain binder which provides in the apparatuses and methods of the prior art some of the advantages thereof, while simultaneously overcoming some of the disadvantages normally associated therewith.

Still another object of the present invention is to provide a new jacking chain binder for safely binding a chain which restrains a cargo load on a vehicle.

Even still another object of the present invention is to provide a new jacking chain binder that includes a sleeve having at least one bore formed therein and a first hook mounted thereon. Also included is a rectangular strip slidably situated within the sleeve and including a second hook mounted thereon. At least one spring biased locking button is provided for entering the bore to preclude movement between the sleeve and the strip. Further, a plurality of teeth are formed on the strip. Also included is a ratchet assembly mounted on the sleeve for retracting the strip within the sleeve upon the reciprocation thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new jacking chain binder according to the present invention.

FIG. 2 is a side view of the present invention.

DESCRIPTION OF THE PREFERRED EMBODIMENT

Figure 3:
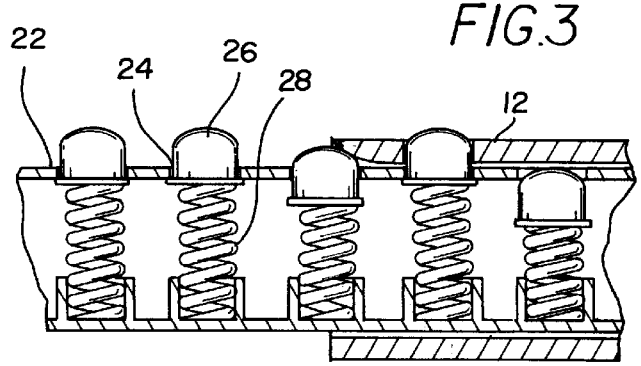
FIG. 3 is a side cross-sectional view of the locking buttons of the present invention.

With reference now to the drawings, and in particular to FIGS. 1 through 7 thereof, a new jacking chain binder embodying the principles and concepts of the present invention and generally designated by the reference numeral 10 will be described.

The present invention, designated as numeral 10, includes a sleeve 12 having a planar rectangular top face, a planar rectangular bottom face and a pair of thin side faces for defining an interior space and a pair of open ends. The sleeve further includes a pair of tapering mounting members 14 having inboard ends integrally coupled to the side faces adjacent one of the open ends of the sleeve and extending outwardly therefrom. Mounted on outboard ends of the tapering mounting members is a swivel 16. Such swivel is in turn rotatable mounted to a first hook 18. For reasons that will soon become apparent, the top face has a pair of spaced bores 20 formed therein adjacent to the open ends of the sleeve.

Next provided is a rectangular strip 22 slidably situated within the sleeve. The rectangular strip includes a planar rectangular top face, a planar rectangular bottom face and a pair of thin side and end faces for defining an interior space. The top face has a plurality of circular bores 24 formed therein, as shown in FIG. 3. Also shown in such Figure, a plurality of locking buttons 26 are each situated within a corresponding one of the circular bores. Ideally, each locking button has a cylindrical lower extent with an annular flange mounted thereon and a semi-spherical upper extent. A plurality of springs 28 are each mounted between the rear face of the strip and an associated one of the locking buttons for urging the same from the associated circular bore. When the spring is fully extended, the upper and lower extent of each button extends through the corresponding bore and the annular flange abuts the top face of the strip.

By this structure, the locking buttons are adapted to be situated within the spaced bores of the sleeve for fixing the strip with respect to the sleeve. Further, the locking buttons may be depressed to allow movement of the strip with respect to the sleeve. It should be noted that this may be accomplished manually or by way of optional locking assemblies which will be set forth hereinafter. The strip also includes a plurality of teeth 30 formed on one of the thin side faces thereof. A second hook 32 is swivelably connected to one of the end faces of the strip.

Figure 5:
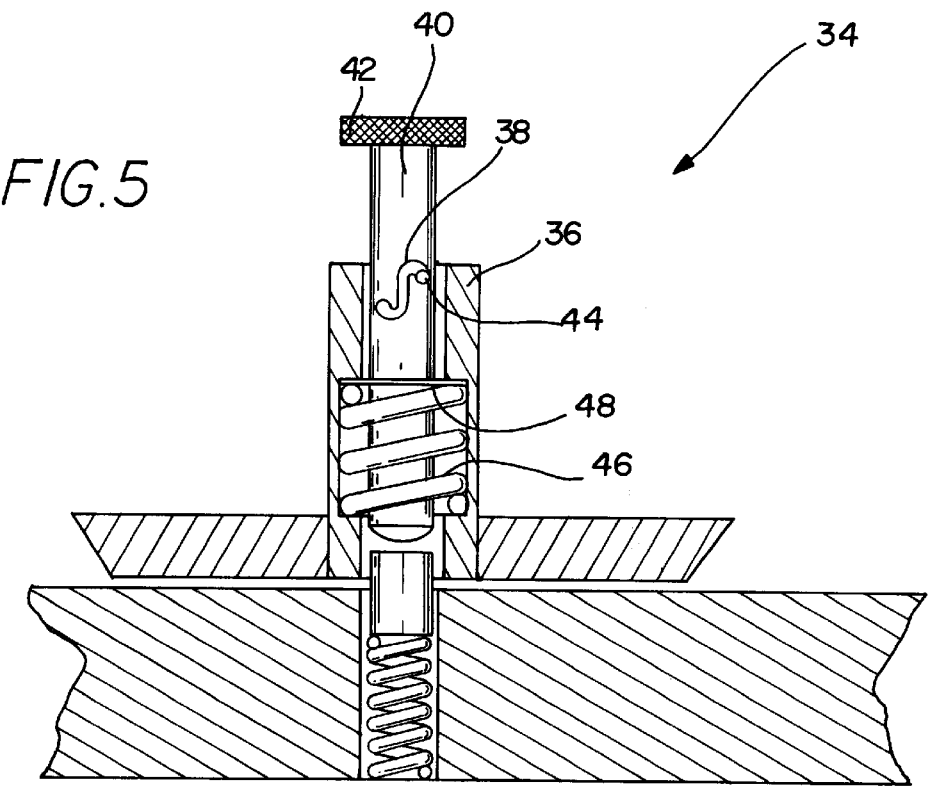
FIGS. 5–6 are side cross-sectional views of the present invention with the addition of the locking assemblies.
Figure 6:
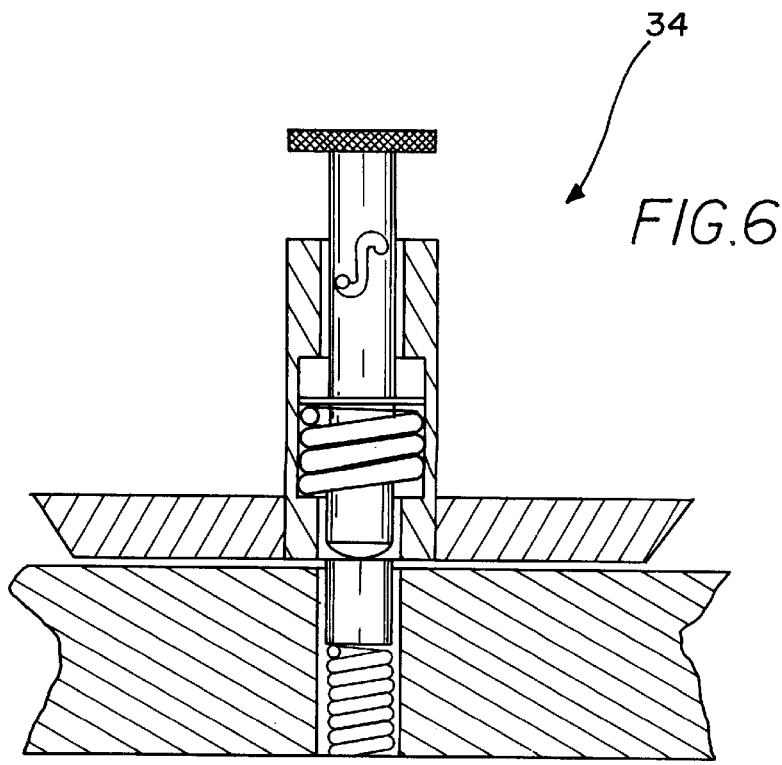
Figure 7:
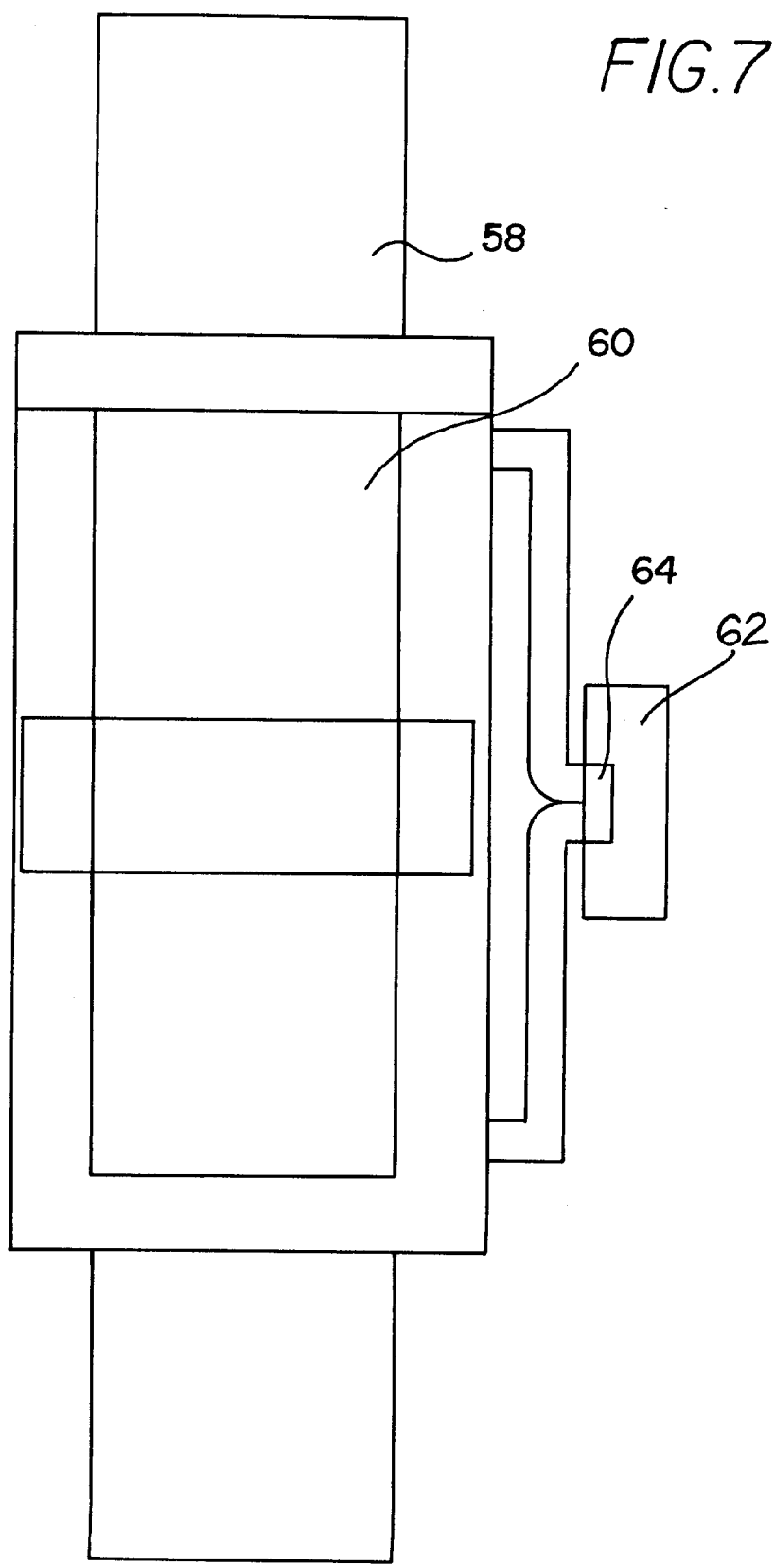
FIG. 7 is a further alternate embodiment of the present invention.

For allowing a user to selectively preclude the use of the locking buttons, a pair of locking assemblies 34 are provided, as shown in FIGS. 5 & 6. Each of the locking assemblies include a tube 36 integrally mounted over an associated one of the spaced bores of the sleeve. An S-shaped groove 38 is formed in a periphery of the tube. Further, a locking pin 40 is slidably situated within the tube with a knurled disk-shaped grip 42 mounted on a top thereof. In addition, the locking pin is equipped with a radially extending peg 44 integrally coupled to a periphery thereof for being slidably received within the S-shaped groove. For urging the locking pin outwardly, a spring 46 is mounted between the locking pin and the tube. To accomplish this, the spring 46 preferably resides within a recess formed in an interior surface of the tube and further abuts an annular lip 48 extending from the locking pin.

By this structure, the locking pins each have a lowered orientation for preventing the locking buttons of the strip from entering the corresponding spaced bore of the sleeve. As such, the strip may slide freely within the sleeve. The locking pins each further have a raised orientation for allowing the locking buttons of the strip to enter the corresponding space bore of the sleeve. In such orientation, the strip is precluded from sliding freely within the sleeve. It should be noted that the locking pins may be transferred between the raised and orientation by way of the rotation thereof such that the radially extending peg is maneuvered within the S-shaped groove. Note FIGS. 5 & 6. In still yet another unillustrated embodiment, the locking buttons may be removed from the strip and the locking pins may be adapted to extend within the spaced bores when in the lowered orientation for locking the strip with respect to the sleeve.

Finally, a ratchet assembly 49 is included with a jack handle 50 pivotally coupled at an inboard end thereof to one of the thin side faces of the sleeve. Such jack handle further remains in engagement with the teeth of the strip for retracting the strip within the sleeve upon the reciprocation of the jack handle. The ratchet assembly further includes a release lever 52 mounted on the top face of the sleeve adjacent to the jack handle. This release lever functions for releasing the jack handle from the teeth of the strip to allow the movement of the strip within the sleeve when, of course, the locking buttons are prevented from entering the spaced bores of the sleeve. It should be noted that the inboard end of the jack handle includes a standard ratchet mechanism that is released by the release lever.

Figure 4:
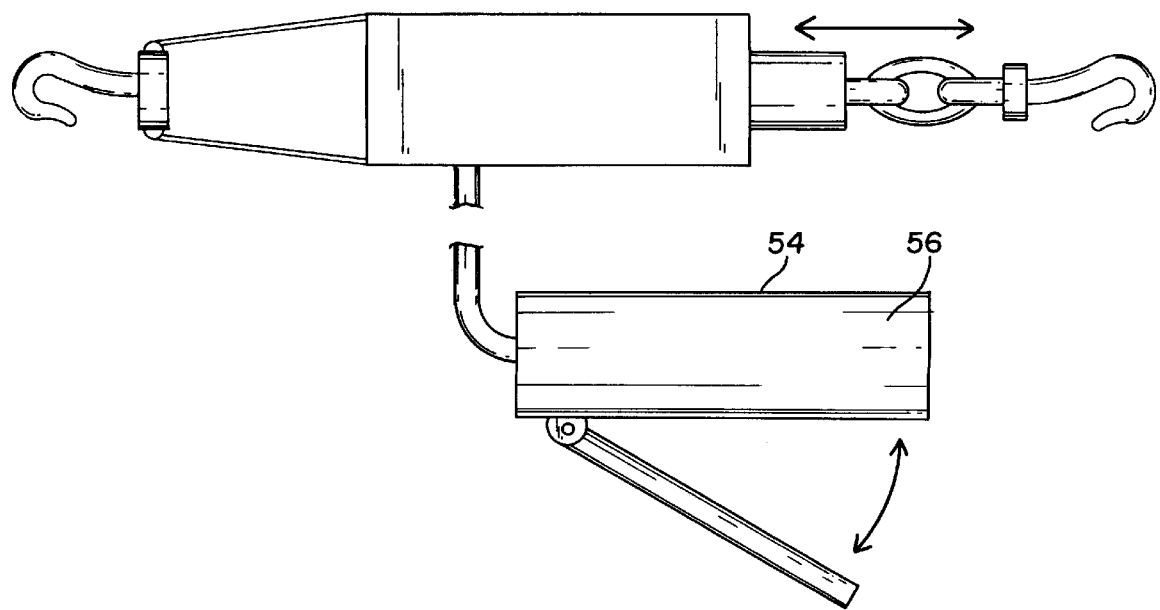
FIG. 4 is an alternate embodiment of the present invention.

In an alternate embodiment, the ratchet assembly is excluded in favor of a hydraulic assembly 54. As shown in FIG. 4, a hand pump 56 is connected to the sleeve for adjusting a pressure within a hydraulic chamber situated between the sleeve and strip. In another related embodiment, a pair of strips 58 are provided with dual fluid chambers 60 which are filled by way of an oil pump 62 and reversible valve 64. Note FIG. 7.

The present invention thus affords an adjustable tie down apparatus that may be attached between a chain or the like and a vehicle. Note FIG. 1. In use, the locking buttons serve to provide a safeguard against inadvertent extension of the strip with respect to the sleeve. Furthermore, the locking assemblies function to selective disable the locking buttons when desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable length strap tie down apparatus comprising:

a sleeve including a planar top face, a planar bottom face and a pair of thin side faces for defining an interior space and a pair of open ends, the sleeve further including a pair of converging mounting members having inboard ends integrally coupled to the side faces adjacent one of the open ends of the sleeve and extending outwardly therefrom, a swivel mounted on outboard ends of the mounting members, and a first hook rotatably mounted on the swivel;

a strip slidably situated within the sleeve and including an end face with a first link fixed to the end face, a second link connected to the first link, and a second hook assembly connected to the second link, the second hook assembly including a connecting portion, a swivel portion connected to the connecting portion, and a hook portion connected to the swivel portion such that the hook portion is swivelable with respect to the connecting portion; and a hydraulic assembly mounted on the sleeve for retracting the strip within the sleeve upon the actuation thereof, the hydraulic assembly including a hydraulic chamber situated between the sleeve and strip for retracting the strip into the sleeve, a hose connected to and in fluid communication with the hydraulic chamber, and a hand operated hydraulic fluid pump for pumping fluid into the hydraulic chamber, the hydraulic pump being in fluid communication with the hose and the hydraulic chamber, the hydraulic pump having a hand operated lever for actuating the hydraulic pump.

* * * * *